United States Patent [19]
Ozawa

[11] Patent Number: 6,058,916
[45] Date of Patent: May 9, 2000

[54] APPARATUS FOR CONTROLLING A MECHANICAL SUPERCHARGER FOR A DIESEL ENGINE

[75] Inventor: Godo Ozawa, Utsunomiya, Japan

[73] Assignee: Komatsu Ltd., Tokyo, Japan

[21] Appl. No.: 09/051,036

[22] PCT Filed: Sep. 30, 1996

[86] PCT No.: PCT/JP96/02843

§ 371 Date: Mar. 31, 1998

§ 102(e) Date: Mar. 31, 1998

[87] PCT Pub. No.: WO97/13061

PCT Pub. Date: Apr. 10, 1997

[30] Foreign Application Priority Data

Oct. 2, 1995 [JP] Japan .................................. 7-278352

[51] Int. Cl.$^7$ ................................................ F02B 39/12
[52] U.S. Cl. ................ 123/559.3; 192/20; 192/225; 123/561
[58] Field of Search ................ 123/559.3, 561; 192/20, 70.17, 225

[56] References Cited

U.S. PATENT DOCUMENTS

| | | | |
|---|---|---|---|
| 2,588,462 | 3/1952 | Baker et al. | 123/561 |
| 2,660,991 | 12/1953 | Wasielewski | 123/559.3 |
| 2,830,472 | 4/1958 | Brass | 123/561 |
| 5,256,109 | 10/1993 | Winkelmann et al. | 123/561 |
| 5,875,766 | 3/1999 | Ozawa | 123/561 |

FOREIGN PATENT DOCUMENTS

| | | | |
|---|---|---|---|
| 973267 | 9/1950 | France | 123/561 |
| 855640 | 11/1952 | Germany | 123/559.3 |
| 59-65645 | 4/1984 | Japan . | |
| 61-181834 | 11/1986 | Japan . | |
| 1-138322 | 5/1989 | Japan . | |
| 2-185625 | 7/1990 | Japan . | |
| 3-35854 | 7/1991 | Japan . | |
| 4-30344 | 7/1992 | Japan . | |
| 63-112239 | 7/1998 | Japan . | |
| WO91/10050 | 7/1991 | WIPO | 123/559.3 |

Primary Examiner—Michael Koczo
Attorney, Agent, or Firm—Sidley & Austin

[57] ABSTRACT

A control apparatus includes a detecting means (16) for detecting the position of an accelerator pedal (14) or an accelerator lever, a clutch (8) which is disposed between a diesel engine (1) and the mechanical supercharger (10), and a coupling/decoupling means (16) for coupling or decoupling a clutch (8) based on a signal from the detecting means (16). A control method includes the steps of detecting the stroke distance of the accelerator pedal (14) or the accelerator lever, and operating the mechanical supercharger (10) when the stroke distance detected ranges from a predetermined value in the vicinity of the full stroke to the full stroke. This improves responsiveness in the initial stage of acceleration, and obtains better normal running performance and better hill-climbing ability.

10 Claims, 11 Drawing Sheets

APPARATUS FOR CONTROLLING A MECHANICAL SUPERCHARGER FOR A DIESEL ENGINE

TECHNICAL FIELD

The present invention relates to an apparatus for controlling a mechanical supercharger for a diesel engine, and particularly to an apparatus and a method for operating the mechanical supercharger when the fuel injection rate of the diesel engine has reached the range from a predetermined value to the maximum injection rate.

BACKGROUND ART

Conventionally, in an engine for a vehicle mainly traveling with wheels, such as a car, a truck, a wheeled loader, a wheel crane, a supercharger has been used to reduce the engine size while increasing the output of the engine, securing good acceleration. As for the supercharger, there is a mechanical supercharging method which uses part of the engine output, or the power of other machinery, and there is a turbocharger supercharging method which uses exhaust gas. For this reason, as the first background with the mechanical supercharging method, a supercharger 40 is mechanically and directly connected to and driven by an engine 41 through gears 42 and 43, or through a belt or the like, as FIG. 14 illustrates. In the directly connected and driving type where air is supplied as illustrated in FIG. 15, in an area A where the engine speed is lower with a higher load, the amount of air which is supplied to the engine is insufficient. In an area B where the engine speed is higher with a lower load, the amount of the air supply is excessive, increasing the driving loss of the supercharger 40.

There has been a differential driving method proposed for driving the supercharger 40 as shown in FIG. 16. In the differential driving method (I) in FIG. 16, a planetary carrier 43 is fixed to and connected to an output shaft 41a of the engine 41, and usually, three of planetary gears 44 are rotatably attached to the planetary carrier 43 equidistantly from one another. A sun gear 45 is meshed with the inner side of the three planetary gears 44, and a ring gear 46 is meshed with the outer side of the three planetary gears 44. At the inside of the sun gear 45, the output shaft 41a of the engine 41 is rotatably disposed. A gear 47 is provided at one end of the sun gear 45, and a driving gear 48 for the mechanical supercharger 40 is meshed with the gear 47. A shaft of a power transmission system 50 for a vehicle is connected to the ring gear 46, and the mechanical supercharger 40 is variably rotated, depending on the load of the power transmission system.

A differential driving method (II) in FIG. 17, for driving a supercharger by a differential driving method similar to the above, has a configuration substantially similar to the above. In the differential driving method (II), the ring gear 46 is provided with a brake 46a which utilizes electricity, dry condition, oil pressure, or the like. The rotational force of the mechanical supercharger 40 is controlled based on the difference in strength of the drag resistance caused by the brake 46a.

Next, as a second background, there is construction machinery which requires higher output at lower and medium engine speed, or there is construction machinery which requires higher output at higher engine speed, depending on the kind of machine used. For example, there is machinery, such as hydraulic shovel or the like, which needs higher output in an area Qa with the engine rotating at higher speed, as shown in FIG. 18. There is machinery, such as a bulldozer, a damp truck, a wheeled loader, a motor grader, or the like, which requires higher output at lower and moderate engine speed as shown in FIG. 19.

When classifying the uses of each machine's engine according to each load, the engine speed, and the frequencies of use, the construction machinery's engine described above is more frequently used in areas Fa and Fb of FIG. 20. In the vehicles with tires, such as a car, a truck for transporting cargo, a bus, a dump truck, a forklift, and the like, and in a fishing boat, a pleasure boat, and in a ship, the engines are more frequently used in areas Fb and Fe. In a word, in construction machinery, the engine is more frequently used under a medium or a higher load, while in a vehicle with tires and in a ship, the engine is more frequently used under a lower or a medium load.

Further, as a third background, in machinery which requires a higher engine output in the entire area, there is a method using both a turbocharger and a mechanical supercharger. In this case, as FIG. 21 shows, at the lower and medium engine speed, a mechanical supercharging method is used to produce higher output as shown by a solid line Ua, while at higher engine speed, the mechanical supercharger is stopped to reduce driving loss, and a turbocharger is used to produce a higher output as shown by line Ub of alternating long and short dashes.

A dotted line Uc shows the output torque of the engine in a non-supercharging condition. Lines Ya and Yb of alternating long and two short dashes, show matching lines of a torque converter when driving a vehicle using a torque converter. The alternating long and two short dashes line Ya shows e=0, while the alternating long and two short dashes line Yb shows e≈1. Incidentally, in the drawing, the axis of abscissa shows the engine speed, and the axis of ordinate shows the output torque (load) of the engine.

The disadvantages in the first background which are desirably eliminated are as follows:

(1) The directly connected and driving type of supercharger in FIG. 14 is more frequently used for an engine with a lower or medium load in a vehicle with traveling tires, and in a ship. In an air supplying condition which is required for an engine with a lower or medium load, this type frequently causes an excessive and unnecessary driving loss of the supercharger. As a result, fuel consumption per hour is greater as compared to a non-supercharged engine or a turbosupercharged engine.

(2) In the conventional differential driving method (I), a load on a vehicle is great while the vehicle is being accelerated from a standing start (acceleration from a standstill); therefore, the rotational speed of the mechanical supercharger increases at first, and after a sufficient amount of air enters the engine, the vehicle starts to travel. Accordingly, an operator receives a slow response in the early stage of pressing down on the accelerator; specifically, an operator has complaint of poor responsiveness.

(3) In the differential driving method (II), part of the engine driving force is lost as a thermal loss due to the dragging resistance of the brake and the like, resulting in a disadvantage that the fuel efficiency is decreased.

The disadvantages in the second and the third backgrounds are as follows:

(4) As FIG. 21 shows, in the method using both a turbocharger and a mechanical supercharger, in a truck for transporting cargo, a bus, a dump truck, a folk lift, or the like, which uses a torque converter, the torque converter (e=0) does not match the higher output Ua produced by a mechanical supercharging method, and there is a disadvantage that the output of the supercharging method cannot be used. In addition, at a higher speed of the engine, a higher output is produced by a turbocharger as shown by the alternating long and short dash line Ub, but an engine in a much smaller size with much higher output and efficiency is desired.

DISCLOSURE OF THE INVENTION

The present invention is made to eliminate the disadvantages of the conventional art, and the first object is to eliminate the slow response in an initial stage of acceleration and to improve the responsiveness by increasing the output of the engine in an area in which greater driving output is required at a time of starting a vehicle, at a time of climbing a hill, or the like. In a vehicle using a torque converter, matching performance with the torque converter is improved, and the driving torque is improved. Another object is to obtain the acceleration ability at a start from a standstill, which is the same as for an engine with a larger bore diameter, better normal running performance, better hill-climbing performance, and an improvement in fuel efficiency.

An apparatus for controlling a mechanical supercharger for a diesel engine in accordance with the present invention is an apparatus for controlling a mechanical supercharger for a diesel engine including an accelerator pedal or an accelerator lever, a governor interlocking with the accelerator pedal or the accelerator lever, an injection pump which is controlled by the governor, a diesel engine which receives fuel from the injection pump and produces an output, and a mechanical supercharger which is driven by the diesel engine, and is characterized by including a detecting means for detecting the position of the accelerator pedal or the accelerator lever, a clutch which is disposed between the diesel engine and the mechanical supercharger, and a coupling/decoupling means for coupling or decoupling the clutch based on a signal from the detecting means.

According to the above configuration, the clutch is coupled in accordance with the position of the accelerator pedal. For example, when the fuel injection rate is equal to or greater than a predetermined value, the clutch is coupled and the mechanical supercharger is operated. As the result, a sufficient amount of air can be supplied when the engine needs more air with a higher load, and a higher output can be obtained. In addition, since the mechanical supercharger is not operated with a lower or medium load with which the engine is more frequently used, driving loss is eliminated.

Further, the apparatus for controlling a mechanical supercharger for a diesel engine can include a hydraulic pump which is driven by the diesel engine, while the clutch can be a hydraulic clutch and a planetary gear train which are disposed between the diesel engine and the mechanical supercharger, and the coupling/decoupling means can be a solenoid valve which is actuated on receiving a signal from the detecting means and which provides or stops a supply of pressurized oil from the hydraulic pump to the hydraulic clutch to couple or decouple the hydraulic clutch.

According to the structure, by using the planetary gear train, a greater reduction ratio can be obtained, and the driving device of the mechanical supercharger becomes small in size. In addition, by using the hydraulic clutch, the durability of the driving device of the mechanical supercharger is improved, even in a vehicle in which the driving device of the mechanical supercharger is frequently used in heavy work.

Further, it is recommended that the oil hydraulic clutch is provided with a torque variance buffering means at the fixed end side of the hydraulic clutch.

According to this structure, twisting vibrations of the engine can be reduced by the torque variance buffering member, thereby eliminating the disadvantages which are caused as a result of the twisting vibrations being transmitted to the mechanical supercharger through the planetary gear train, for example, the disadvantage of breaking the gears of the planetary gear train or the mechanical supercharger, and the disadvantage of causing pitch on the surfaces of the gears.

The detecting means outputs a signal to the coupling/decoupling means or to the solenoid valve, and couples the clutch or the hydraulic clutch, when the detected position is in the vicinity of the maximum injection rate of the fuel.

According to this structure, when the load on the engine is higher, sufficient air can be supplied as necessary by operating the mechanical supercharger; therefore, a higher output can be obtained. With a lower or medium load with which the engine is more frequently used, the supercharger is not operated; therefore, the driving loss can be eliminated.

Further, a turbocharger can be connected in series with the mechanical supercharger to increase the output of the diesel engine.

According to this structure, both the mechanical supercharger and the turbocharger are used, and the mechanical supercharger can be operated when the load on the engine is higher, thereby obtaining the acceleration at a start from a standstill which is the same as for an engine with a greater bore diameter, better normal running ability, better hill-climbing ability, and an improvement in fuel efficiency.

A change-over switch for outputting a coupling command to the clutch or to the hydraulic clutch can be included to operate the mechanical supercharger based on the coupling command.

According to this structure, an operator operates the change-over switch as necessary, and couples the clutch to rotationally drive the mechanical supercharger, so that the amount of air supplied to the engine can be increased. The suppling of fuel is increased according to the position of the accelerator; therefore, a higher output can be obtained. In addition, the output of the engine is increased only when the operator needs a higher output; therefore, the efficiency of fuel or the like is improved.

A method for controlling a mechanical supercharger for a diesel engine according to the present invention is characterized by detecting a stroke distance of an accelerator pedal or an accelerator lever, and by operating the mechanical supercharger when the detected stroke distance ranges from a predetermined value in the vicinity of the full stroke to the full stroke.

According to this structure, the output of the engine is increased in an area in which a greater driving force is needed at the time of starting from a standstill, or at the time of climbing a hill; therefore, the responsiveness is improved. In a vehicle using a torque converter, matching ability with the torque converter is improved.

BRIEF DESCRIPTION OF THE DRAWINGS

FIG. 10 is a diagram for explaining the relationship between the vehicle speed and the tractive force when a control apparatus of the present invention is applied to a crane truck or the like;

FIG. 11 is a diagram for explaining the relationship between the engine speed and the output torque when the control apparatus of the present invention is applied to a ship or the like;

FIG. 18 is a diagram for explaining the output line of the conventional diesel engine which is required for higher output when used in a hydraulic shovel or the like;

BEST MODE FOR CARRYING OUT THE INVENTION

A preferred embodiment in accordance with the present invention will be described below with the reference to the attached drawings.

Figure 1:
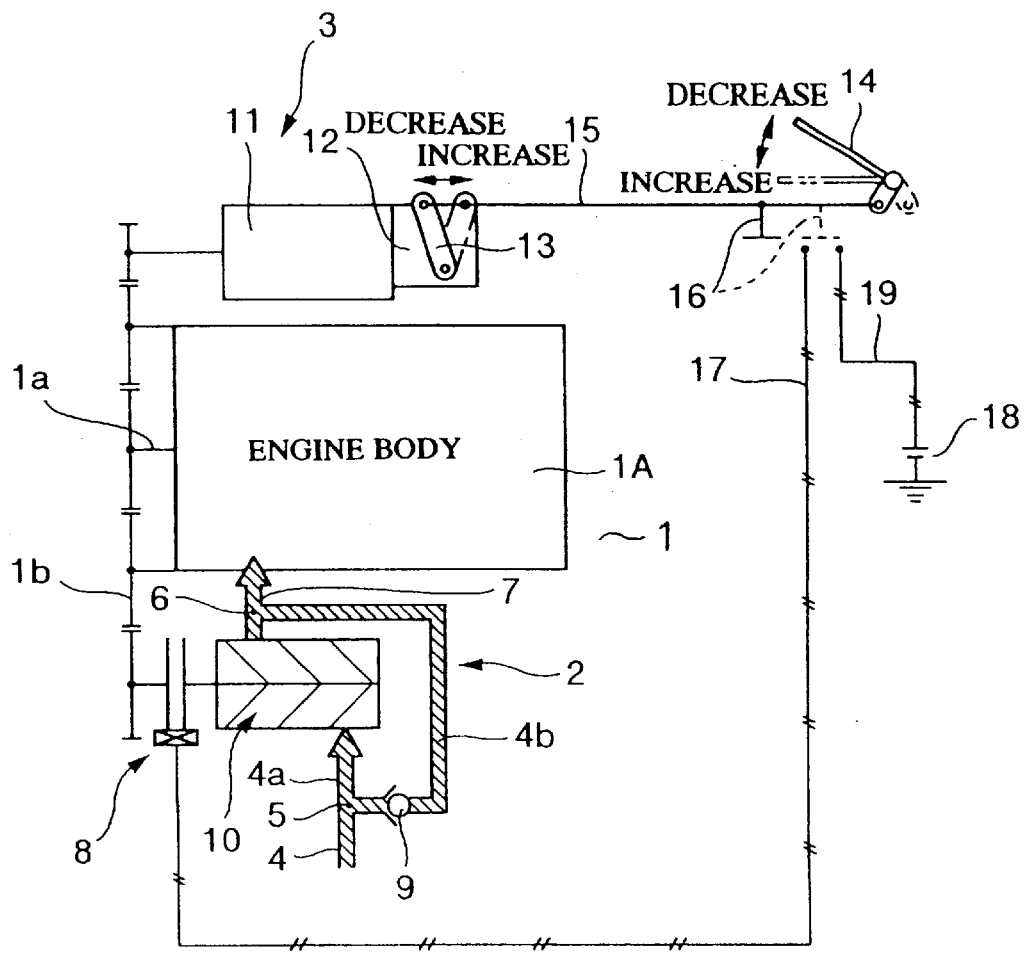
FIG. 1 is a block diagram of a first embodiment of the present invention.

FIG. 1 is a diagram showing a first embodiment of the present invention, and is a block diagram of a system around a diesel engine 1 (hereinafter referred to as an engine 1) which is provided on a vehicle with tires or the like, or on a ship or the like, and which controls the output by using a supercharger 10 and a minimum-to-maximum governor. The engine 1 comprises of a suction system 2 for supplying air, a fuel control unit 3, an engine body 1A, and an exhaust system which is not shown in the drawing.

The suction system 2 comprises a suction passage 4, an electromagnetic clutch (clutch) 8, a check-valve 9, and a mechanical supercharger 10. The suction system 2 is provided with the suction passage 4 which guides air to the engine 1. The suction passage 4 branches into a first branch passage 4a and a second branch passage 4b at a branching junction 5, and both of the branch passages 4a and 4b meet at a meeting junction 6 to be a suction passage 7, a single passage, once again. The suction passage 4, upstream of the branching junction 5, is provided with an air cleaner which is not shown in the drawing. The first branch passage 4a is provided with the mechanical supercharger 10 which is driven through a gear 1b by the output shaft 1a of the engine body 1A via the medium of the electromagnetic clutch 8. The second branch passage (bypass passage) 4b which bypasses the mechanical supercharger 10 is provided with the check-valve 9, having a function of preventing the air pressurized by the mechanical supercharger 10 from escaping upstream during supercharging.

The fuel control unit 3 comprises of an in-line fuel injection pump 11, a minimum and maximum speed control type of governor 12 (hereinafter referred to as M—M governor 12), and an accelerator pedal 14, which have been conventionally used. A lever 13, which increases and decreases fuel injection rate, is attached to the M—M governor 12, and interlocks with the accelerator pedal 14 by means of a rod (or a wire) 15. The rod 15 is provided with a switch (detecting means) 16 for detecting the degree of opening of the accelerator pedal 14. In addition, the switch 16 can connect and disconnect a wiring 17 of the electromagnetic clutch 8 to or from a wiring 19 of a battery 18 in correspondence to the degree of opening, and the switch 16 also forms a coupling/decoupling means for coupling or decoupling the electromagnetic clutch 8. Incidentally, the switch 16 in the embodiment combines a detecting means and a coupling/decoupling means, but these means can be separated as a detecting means 16 and a coupling/decoupling means 16. An accelerator lever can be used instead of the accelerator pedal 14 which is used in the embodiment.

Figure 2:
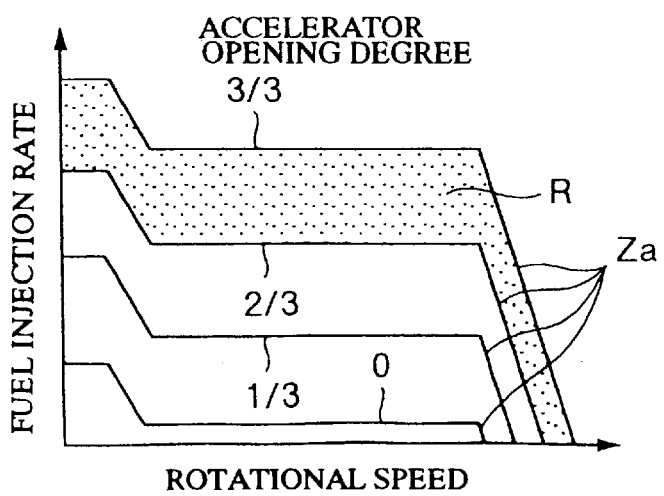
FIG. 2 is a diagram for explaining the relationship among the engine speed, the fuel injection rate of minimum-maximum governor (M—M governor), and the amount of acceleration in accordance with the present invention.

Next, the operation will be explained with reference to FIG. 2. In FIG. 2, the axis of abscissa shows the speed of the engine 1, and the axis of ordinate shows the fuel injection rate, while the solid lines Za show the degree of opening of the accelerator pedal 14, specifically, the stroke distance of the accelerator pedal 14. The operation of the mechanical supercharger 10 is set, based on the degree of opening of the accelerator pedal 14. Explaining the relationship between the characteristics of the fuel injection rate of the M—M governor 11 and the degree of opening of the accelerator 14 with reference to FIG. 2, the mechanical supercharger 10 is operated in an area R (the area shown by dots) in which the accelerator opening is a predetermined degree, for example, from ⅔ to 3/3 (FULL). The operation of the mechanical supercharger 10 is stopped when the accelerator opening degree is below ⅔, and the engine 1 is operated without supercharging. Specifically, the supercharger is operated only when the load is higher, and the supercharger is not operated with a lower or medium load with which the engine is more frequently used, so that the driving loss is reduced.

As for the actuation of the mechanical supercharger 10, when the degree of opening of the accelerator pedal 14 is ⅔ or greater, electric current passes as the result of the operation of the switch 16 which detects the accelerator opening degree, and electric current passes from the battery 18 to couple the electromagnetic clutch 8 and then to rotate the mechanical supercharger 10. When the degree of opening of the accelerator pedal 14 is below ⅔, the electromagnetic clutch 8 is decoupled as the result of the operation of the switch 16 which detects the accelerator opening degree, and the rotation of the mechanical supercharger 10 is stopped.

As for the air flow during the supercharging operation, air flows from the suction passage 4, which leads to the engine 1, to the branch junction 5, the first branch passage 4a, and the mechanical supercharger 10, in which the air is pressurized, and the air passes through the meeting junction 6 and the suction passage 7 to be supplied to the engine 1. The check-valve 9 is provided at the portion between the meeting junction 6 and the second branch passage 4b; therefore, air does not flow backwardly. As for the air flow during the non-supercharging operation, air passes from the suction passage 4 through the branching junction 5, the check-valve 9, the second branch passage 4b, the meeting junction 6, and the suction passage 7 to be supplied to the engine 1.

Figure 3:
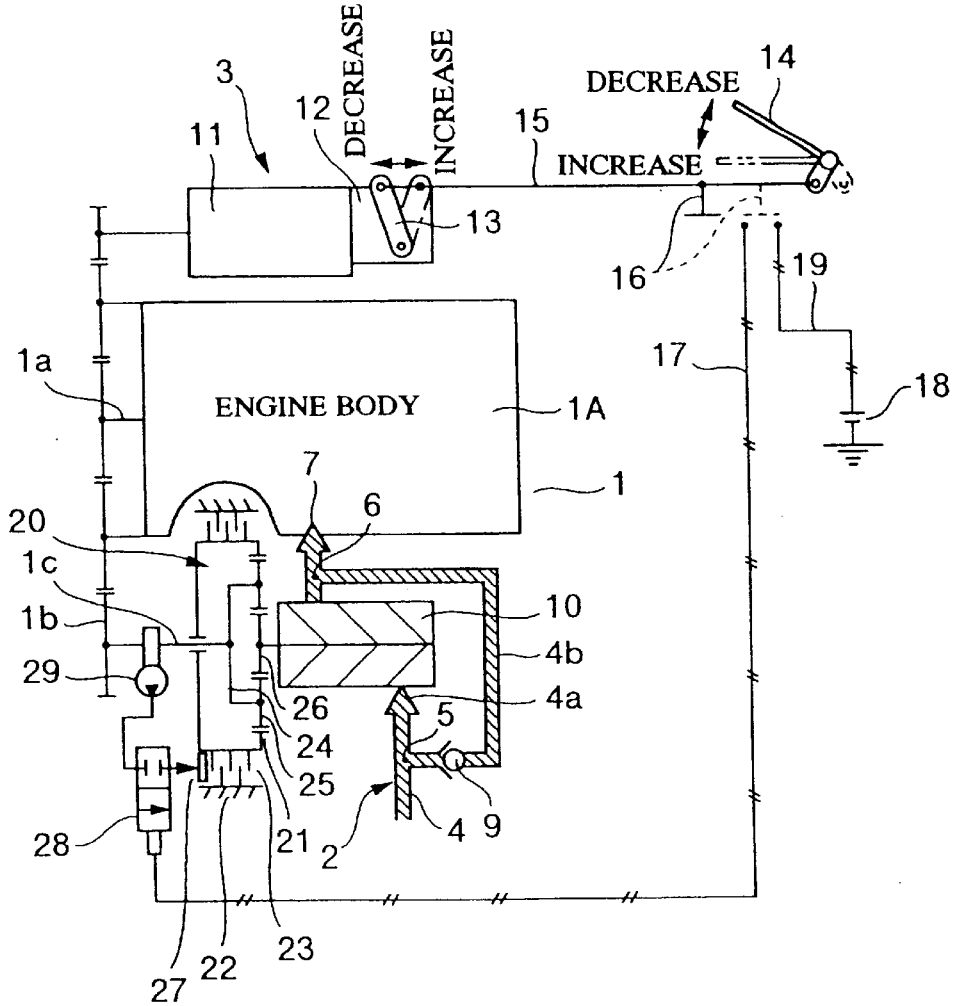
FIG. 3 is a block diagram of a second embodiment of the present invention.

Next, a second embodiment of the present invention will be explained with reference to the drawings. In FIG. 3, a planetary gear train 20 is provided between the engine body 1A and the mechanical supercharger 10, and a hydraulic clutch 23 is provided between an outer circumference of the ring gear 21 of the planetary gear train 20 and a fixed outer wall 22.

In the planetary gear train 20, a planetary carrier 24 is secured and connected to the output shaft 1a of the engine 1 through the gear 1b, and usually, three of planetary gears 25 are rotatably attached to the planetary carrier 24 equidistantly from one another. The ring gear 21 is meshed with the outer side of the three of the planetary gears 25, and is rotatably disposed at a shaft 1c of the gear 1b, while in the inner side thereof, a sun gear 26 drives the mechanical supercharger 10.

A wet and multiple disc clutch is used as a hydraulic clutch 23, which is disposed between the ring gear 21 of the planetary gear train 20 and the fixed outer wall 22. The hydraulic clutch 23 connects to a solenoid valve (coupling/decoupling means) 28 through a hydraulic piston 27, and is coupled and decoupled by operating the hydraulic piston 27 with the solenoid valve 28. The solenoid valve 28 is connected to a hydraulic pump 29 which is driven by the output shaft 1a of the engine 1. The hydraulic pump 29 takes in oil from an oil tank of the engine 1, or another oil tank which is provided below the planetary gear train 20, and supplies the oil to the hydraulic piston 27 through the solenoid valve 28. In the second embodiment, the switch 16 operates as a detecting means.

Next, the operation will be explained with reference to FIG. 2. As for the actuation of the mechanical supercharger 10, when the degree of opening of the accelerator pedal 14 reaches a predetermined degree, for example, the degree equal to ⅔ or more, electric current flows as the result of the operation of the switch 16 which detects the opening degree, and electric current flows from the battery 18 to actuate the solenoid valve 28. Oil flows from the hydraulic pump 29 to the hydraulic piston 27, and the hydraulic clutch 23 is coupled to drive the mechanical supercharger 10. The hydraulic clutch 23, which is of a wet and multiple disc type, is superior in durability, with less electric power consumption of the solenoid valve 28, and a greater speed up ratio can be obtained by using the planetary gear train, reducing the sizes of the planetary gear train 20 and the mechanical supercharger 10.

Figure 4:
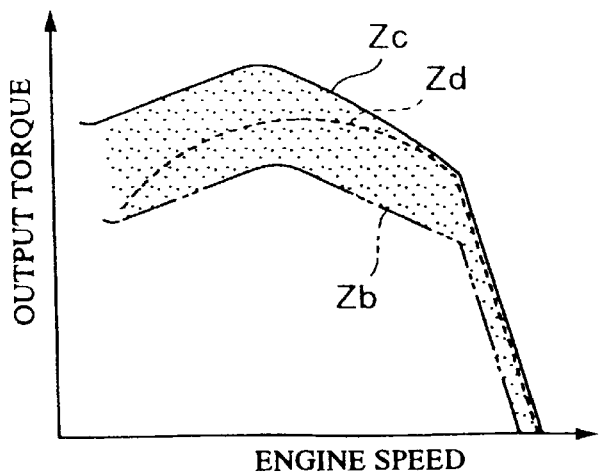
FIG. 4 is a diagram for explaining the relationship among the engine speed, the output torque of the engine, and a period in which a mechanical supercharger is operated in accordance with the present invention.

As described above, in both of the first and second embodiments, the mechanical supercharger 10 is actuated by coupling the electromagnetic clutch 8 or the hydraulic clutch 23 based on a signal from the switch 16 which detects the position of the accelerator pedal 14 when the fuel injection rate is in the vicinity of the maximum injection rate. Specifically, the mechanical supercharger 10 is operated only when the supply of pressurized air is needed in the engine 1 with a higher load. Accordingly, with a lower, or medium load with which the engine is more frequently used, and in which the supply of pressurized air is not needed, the mechanical supercharger 10 is not operated; therefore, there is no driving loss. Accordingly, the mechanical supercharger 10 produces greater torque at low speed, as compared to the conventional turbocharger (not illustrated) as FIG. 4 shows, and provides a supercharging method with excellent responsiveness at the time of acceleration. In FIG. 4, the axis of abscissa shows the speed of the engine 1, and the axis of ordinate shows the output torque, while a line Zb, of alternating long and two short dashes, shows the output torque during non-supercharging operation, and a solid line Zc shows the output torque produced by supercharging by the mechanical supercharger 10. A dotted line shows an output torque Zd produced by supercharging by a turbocharger.

Figure 5:
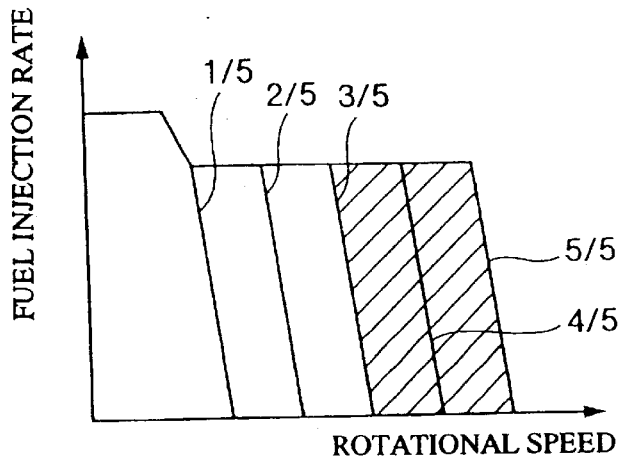
FIG. 5 is a diagram for explaining the relationship among the engine speed, the fuel injection rate of a mechanical-RSV governor, and the amount of acceleration, in accordance with the present invention.

In the embodiments described above, the M—M governor is used in the explanation, but an all-speed governor can be used as follows. FIG. 5 is a control diagram of the mechanical supercharger 10 when using a mechanical RSV governor (RSV governor is a governor made by Bosch Ltd., in Germany) which is not illustrated in the drawing. Similarly to FIG. 2, the axis of abscissa shows the engine speed, and the axis of ordinate shows the fuel injection rate, while the oblique lines in the drawing show the stroke, specifically, the degree of opening of the accelerator lever, or the accelerator pedal. For example, ⅘ (FULL) shows the operation at the full stroke, and ⅘ shows the operation at 8% of the entire stroke. In FIG. 5, the mechanical supercharger 10 is operated in the area with a predetermined acceleration opening degree, for example, from ⅗ to ⅘ (FULL) (the portion with oblique lines in the drawing). With the acceleration opening degree of less than ⅗, the operation is stopped, and the engine 1 is driven without supercharging. Specifically, the supercharger is used only when the load is higher, and the supercharger is not operated with a lower or medium load with which the engine is more frequently used; therefore, driving loss is reduced.

Figure 6:
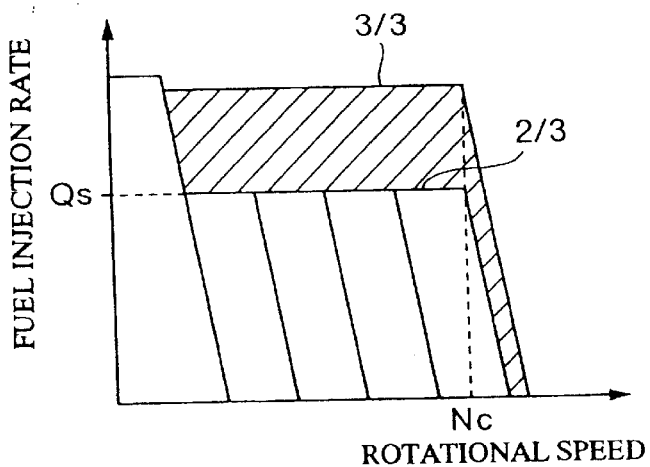
FIG. 6 is a diagram for explaining the relationship among the engine speed (constant speed at the time of producing higher speed), the fuel injection rate of an electronically controlled RSV governor, and the amount of acceleration, in accordance with the present invention.
Figure 7:
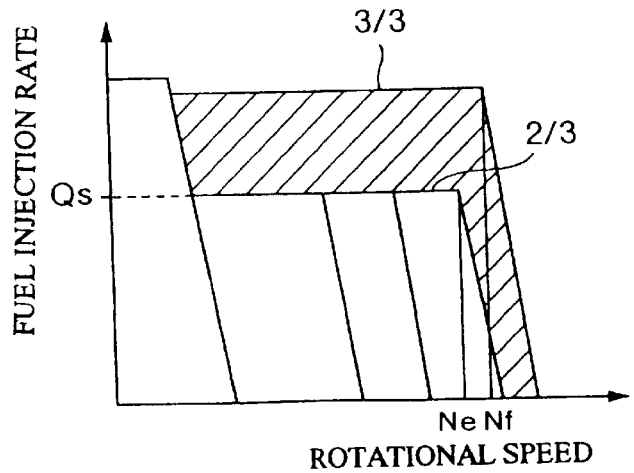
FIG. 7 is a diagram for explaining the relationship among the engine speed (varying speed at the time of producing higher speed), a electronically controlled RSV governor, and the amount of acceleration, in accordance with the present invention.

FIGS. 6 and 7 are control diagrams of the mechanical supercharger 10 when using an electronically controlled RSV governor. In FIGS. 6 and 7, when the fuel injection rate is below a predetermined amount Qs, the governor functions as an all-speed governor as in FIG. 5, and when the fuel injection rate is equal to or greater than the predetermined amount Qs, the governor functions as a minimum-maximum speed governor (M—M governor) as in FIG. 2. In FIG. 6, in a M—M area (the area except the portion in which the all-speed governor type of operation is carried out) in which the fuel injection rate is equal to or greater than the predetermined amount Qs, the engine speed Nc is kept constant even if the fuel injection rate is changed. In FIG. 7, in the M—M area (the area except the portion in which the all-speed governor type of operation is carried out) in which the fuel injection rate is equal to or greater than the predetermined amount Qs, the engine speed increases from an engine speed Ne to an engine speed Nf when the fuel injection rate is increased.

In FIGS. 6 and 7, the mechanical supercharger 10 is operated in the M—M area in which the fuel injection rate is equal to or greater than the predetermined amount Qs. For example, with the accelerator opening degree being below ⅔, the operation is stopped and the engine 1 is driven without supercharging, while with the accelerator opening degree being equal to or greater than ⅔, the mechanical supercharger 10 is operated.

Figure 8:
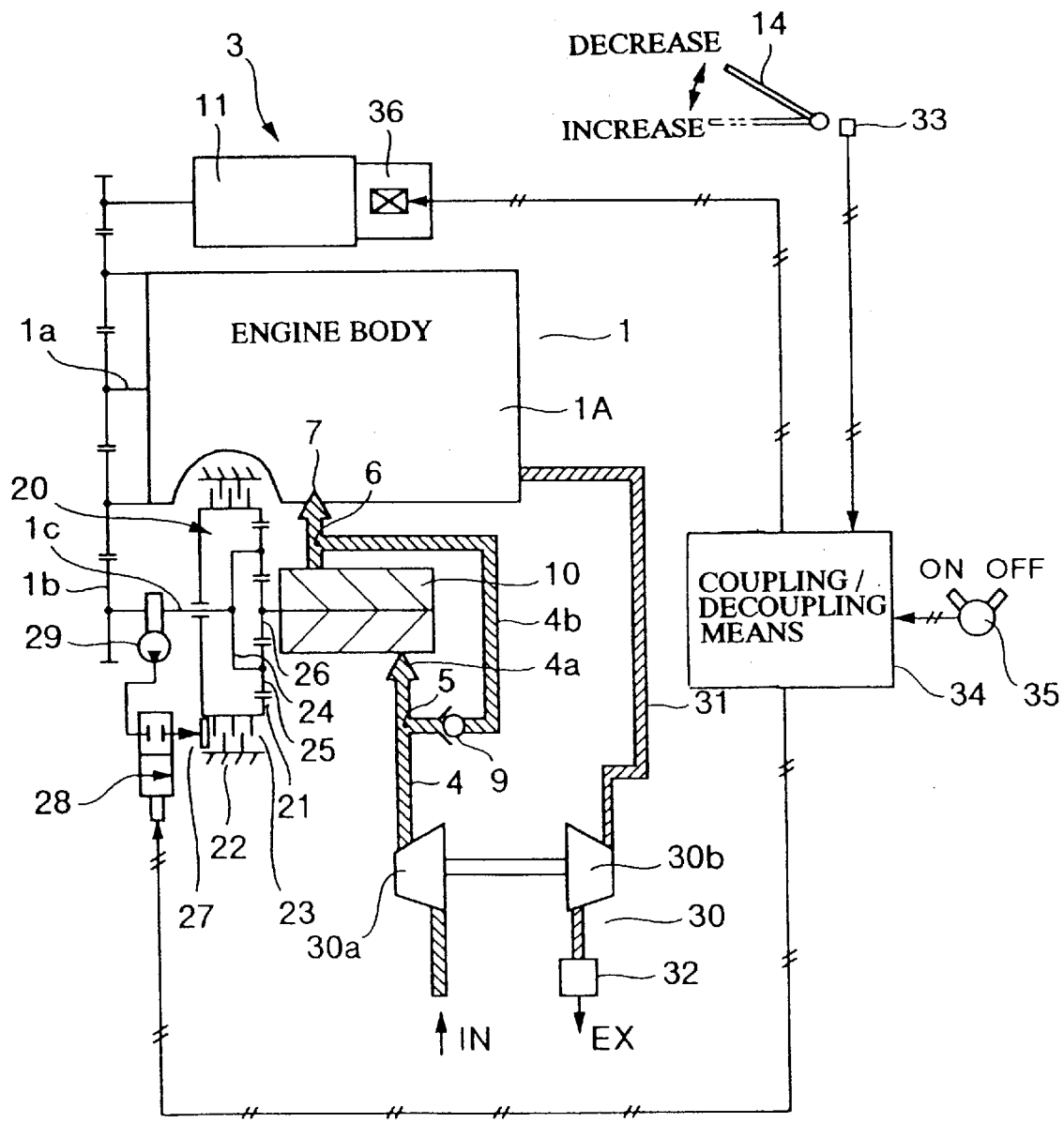
FIG. 8 is a block diagram of a third embodiment of the present invention.

Next, a third embodiment of the present invention will be explained with reference to the drawings. FIG. 8 shows the third embodiment, and a turbocharger 30 is added to the suction side of the mechanical supercharger 10 in the second embodiment.

In FIG. 8, the suction passage 4 of the mechanical supercharger 10 is connected to the turbocharger 30, and a suction air blower. 30a of the turbocharger 30 takes in outside air from an air cleaner which is not illustrated in the drawing. The turbocharger 30 is connected to an exhaust pipe 31 from the engine 1, and an exhaust blower 30b of the turbocharger 30 receives exhaust gas from the engine 1, rotating and discharging the exhaust gas from the engine 1 to the outside through a muffler 32.

In the second embodiment described above, the solenoid valve 28 is switched as the result of passing electric current by operating the switch 16 based on the degree of opening of the accelerator pedal 14, but in the third embodiment, a stroke distance detecting sensor 33 for detecting the degree of opening of the accelerator pedal 14 is additionally provided, and a signal therefrom is inputted into a coupling/decoupling command means 34 such as a controller or the like. The coupling/decoupling command means 34 outputs to the solenoid valve 28 the command to switch, and switches the solenoid valve 28, which couples and decouples the hydraulic clutch 23. Accordingly, in the third embodiment, the coupling/decoupling means comprises of the coupling/decoupling command means 34 and the solenoid valve 28. The coupling/decoupling command means 34 can be provided with a change-over switch 35 which issues the command to switch the solenoid valve 28 to connect to the hydraulic clutch 23, in order to actuate the mechanical supercharger 10. In the second embodiment, the M—M governor 12 is used, but in the third embodiment, an electronically controlled RSV governor 36 is used. The RSV governor 36 is connected to the coupling/decoupling command means 34, and the coupling/decoupling command means 34 outputs a command to the RSV governor 36, linking to a signal received from the stroke distance detecting sensor 33. The RSV governor 36 supplies the engine body 1A with the discharge from the fuel injection pump 11 corresponding to the signal. As the result, the output torque of the engine 1 is increased.

The operation in the above configuration will be explained with reference to FIG. 9. The axis of abscissa shows the speed of the engine 1, and the axis of ordinate shows the output torque. The line Ta, of alternating long and short dashes, shows the output torque during non-supercharging operation, and a dotted line Tb shows the output torque produced by supercharging with the turbocharger 30, while the solid line Tc shows the output torque produced by supercharging with the mechanical supercharger 10. The line e, of alternating long and two short dashes, in the drawing shows the matching line of the torque converter.

When the engine 1 is started to be rotated and actuated by turning on (ON) a starting switch, which is not illustrated in the drawing, the exhaust gas in the engine 1 enters the exhaust blower 30b from the, exhaust pipe 31, and rotates the turbocharger 30. The suction air blower 30a is rotated by the rotation of the turbocharger 30, and takes in the outside air from the air cleaner to supply the air to the engine 1. At this time, since the mechanical supercharger 10 does not rotate, pressurized air taken in the turbocharger is supplied to the engine 1 through the suction passage 4, the check-valve 9, the second branch passage 4b, the meeting junction 6, and the suction passage 7. As the result, the output torque Tb during the rotation of the turbocharger 30 of the engine 1 increases as shown by the dotted line in FIG. 9, as compared to the torque Ta during non-supercharging operation. Further, an operator presses down the accelerator 14 in order to cope with a load, or in order to increase the speed of the engine 1 to increase the speed of the vehicle.

When the accelerator 14 is pressed down, and the degree of opening reaches a predetermined set stroke distance, for example, the accelerator opening degrees shown in FIGS. 2, 5, 6, or 7, a signal is inputted into the coupling/decoupling command means 34 by the stroke distance detecting sensor 33 for detecting the degree of opening, and the coupling/decoupling command means 34 receives the signal, and outputs the command to switch to the solenoid valve 28. The solenoid valve 28 is actuated, and oil flows from the hydraulic pump 29 to the hydraulic piston 27. The hydraulic clutch 23 is coupled, and the mechanical supercharger 10 starts rotating. As the result, the pressurized air taken in the turbocharger 30 enters the mechanical supercharger 10 from the suction passage 4, and then the pressurized air, which is further pressurized, is supplied to the engine 1 through the meeting junction 6 and the suction passage 7. As the result, the output torque Tc during the rotation of the turbocharger 30 of the engine 1 and the mechanical supercharger 10 further increases to be higher as shown by the solid line Tc in FIG. 9. In the above embodiment, when the accelerator opening degree reaches a predetermined value, the accelerator opening degree is detected by the stroke distance sensor 33 for detecting the degree of opening, and rotationally drives the mechanical supercharger 10. However, it can be constructed in such a way that an operator can switch the solenoid valve 28 to couple the hydraulic clutch 23 by pressing the change-over switch 35 which can be a push-bottom switch as necessary, and to increase the amount of air to be supplied to the engine 1 by rotationally driving the mechanical supercharger 10 while increasing the fuel according to the accelerator opening degree, so that a much higher output is produced.

The engine 1, which is supercharged by the mechanical supercharger 10 and the turbocharger 30 as described above, and which has the output torque increased as shown by the solid line Tc, has great effects if used as the engine of, for example, a crane truck or the like adopting a torque converter, or as the engine of a ship. Incidentally, in the above, the second embodiment is used in the explanation, but it goes without saying that it is suitable to additionally provide the turbocharger 30 in the first embodiment.

Next, the engine 1 used in a crane truck will be explained. First, at the time of starting the vehicle with a greater weight, an operator presses down the accelerator pedal 14 to a predetermined set stroke distance (accelerator opening degree) or more. As the result, the torque converter (not illustrated) stops the output side, or decreases the rotation of the output side, and the matching line of the torque converter is on e≈0 shown in FIG. 9. Accordingly, the matching point with the output torque Tb during the rotation of the turbocharger 30 is at a point Ma, and the matching point with the output torque Tc during the rotation of turbocharger 30 and the mechanical supercargo 10 is at a point Mb. The tractive force which is outputted from the torque converter at this time is a tractive force Fa at the point Ma of the output torque Tb when rotating the turbocharger 30, and is a tractive force Fb at the point Mb of the output torque Tc when rotating both the turbocharger 30 and the mechanical supercharger 10, as shown in FIG. 10. For example, the tractive force Fb, when operating both of the turbocharger 30 and the mechanical supercharger 10, increases by some 20% in tractive force, as compared to the tractive force Fa when only rotating the turbocharger 30. The tractive force can increase by some 20% during a hill climbing, resulting in an improvement in hill-climbing ability.

Figure 9:
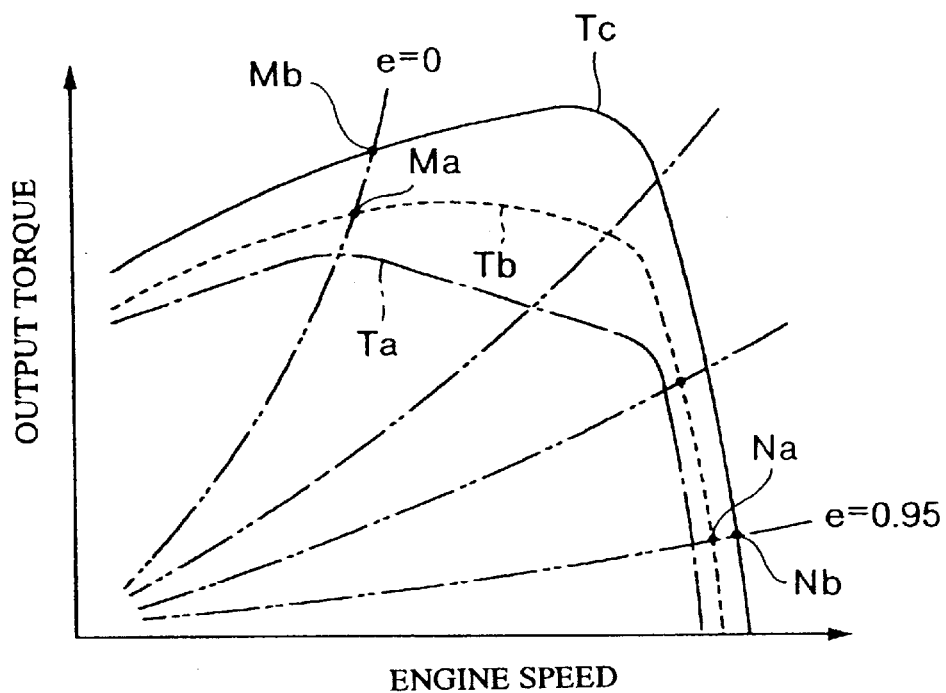
FIG. 9 is a diagram for explaining the relationship among the engine speed, the output torque of the engine, and a period in which the mechanical supercharger is operated in the third embodiment of the present invention.
Figure 10:
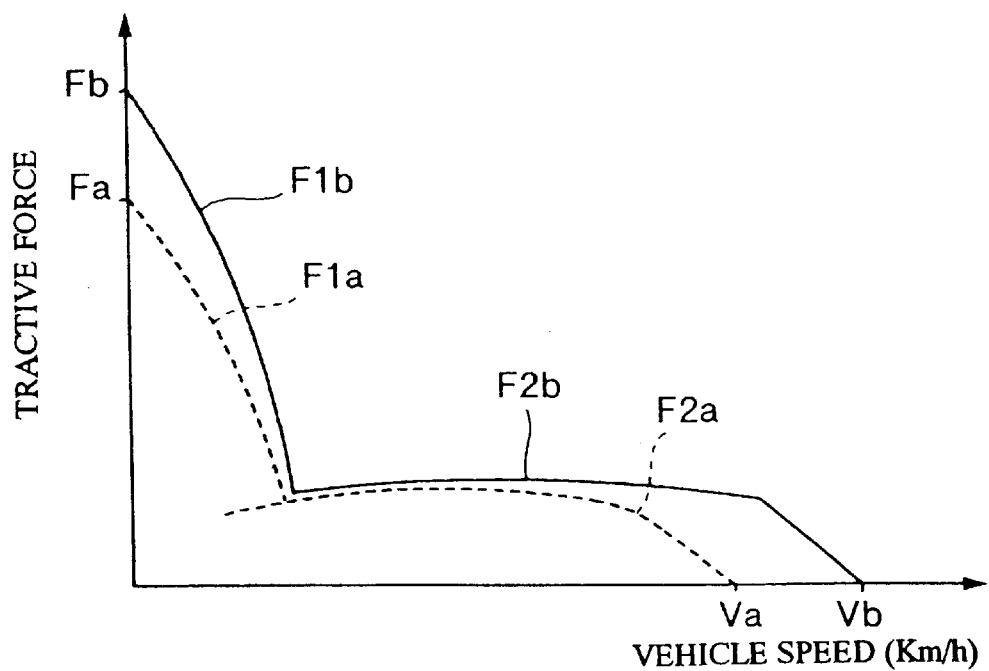

When running at a high speed (for example, when a crane truck or the like is moving forwardly in the second gear), the matching line of the torque converter becomes e≈0.95 as shown in FIG. 9. Accordingly, the matching point with the output torque Tb during the rotation of the turbocharger 30 is at a point Na, and the matching point with the output torque Tc during the rotation of both the turbocharger 30 and the mechanical supercharger 10 is at a point Nb. A vehicle speed V, which the torque converter outputs at this time, is at a vehicle speed Va at the point Na of the output torque Tb during the rotation of the turbocharger 30, and the vehicle speed V is at a vehicle speed Vb at the point Mb of the output torque Tc during the rotation of both of the turbocharger 30 and the mechanical supercharger 10. For example, in a crane truck, the vehicle speed Vb, when operating both the turbocharger 30 and the mechanical supercharger 10, is 65 km/h, increasing from 54 km/h, compared to the vehicle speed Va during the rotation of the turbocharger 30, resulting in an increase by some 20% in speed.

When comparing the sizes of the engine 1, by providing both of the turbocharger 30 and the mechanical supercharger 10, the output of an engine measuring 108 mm in bore diameter with six cylinders can be equal to the output of an engine which is provided with the turbocharger 30 and which measures 125 mm in bore diameter with six cylinders, and the engine measuring 108 mm in bore diameter can obtain the acceleration at the start from a standstill similar to the engine measuring 125 mm in bore diameter, and can attain better normal running performance, better hill-climbing ability, and an improvement in fuel efficiency. Normal running performance, or hill-climbing ability is especially improved by increasing the amount of pressing down of the accelerator as necessary, or by pressing a push-bottom to rotate the mechanical supercharger 10 to increase the output and to increase the hill-climbing ability or vehicle speed by some 20%.

The engine 1 functions as an engine with a small piston displacement when decoupling off the hydraulic clutch 23 of the mechanical supercharger 10 during partial driving; therefore, the fuel efficiency can be improved as compared to an engine (in the above example, bore diameter of 125 mm) which produces a similar amount of output to the engine 1.

Figure 11:
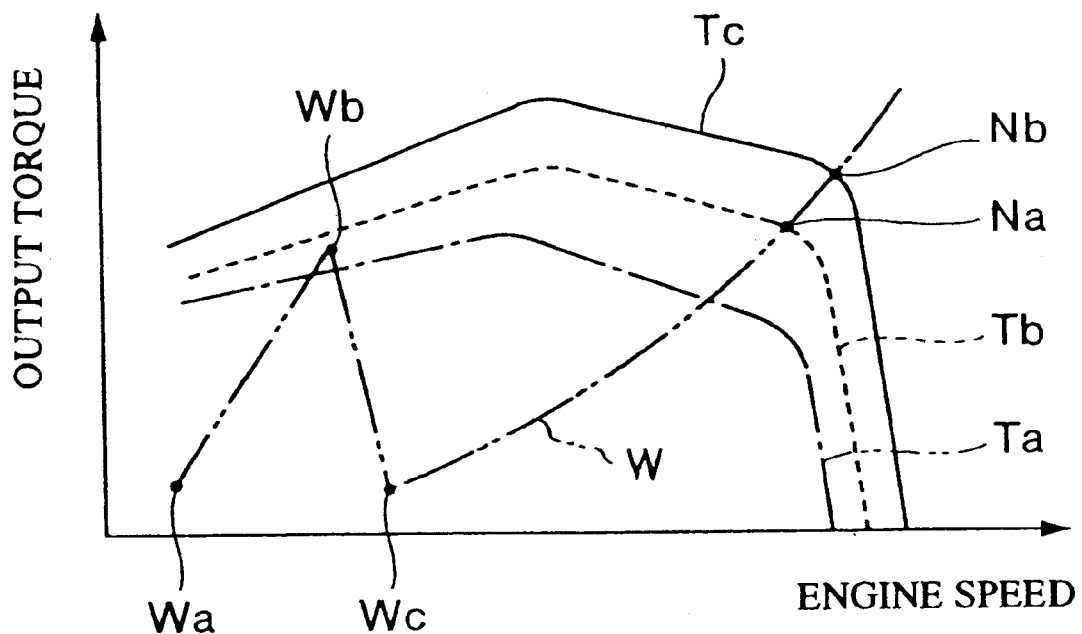
Figure 12:
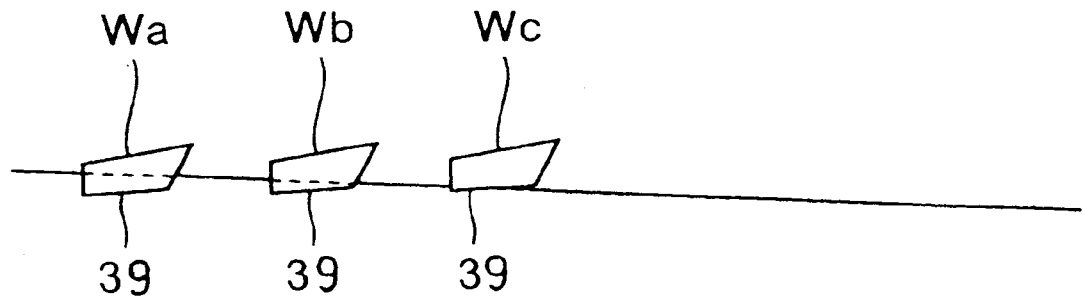
FIG. 12 is an explanatory diagram of the attitude in each condition of a ship using the control apparatus of the present invention.

Next, the engine 1 as used in a ship will be explained. FIG. 11 is an explanatory diagram of the engine 1 used in a ship 39 (see FIG. 12), and the output lines Ta, Tb, and Tc are the same as those in FIG. 9. In FIG. 11, the axis of abscissa shows the speed of the engine 1, and the axis of ordinate shows the output torque (proportional to tractive force). Line W, of alternating long and two short dashes, in the drawing is a required torque diagram of the ship 39, and Wa shows the required torque at the time of starting, while Wb shows the required torque before planing, and Wc shows required torque after planing. FIG. 12 shows the attitude of the ship 39, and Wa at the starting time shows the ship 39 stopped on the water line at a predetermined depth. The Wb before planing shows a condition in which the ship 39 travels at a speed below a predetermined speed with the front part of the ship rising a little and with the resistance of water being the greatest. The Wc after planing shows a condition in which the ship 39 travels at a speed equal to or greater than a predetermined speed with the front part of the ship 39 elevated and with the resistance of the water being the smallest. The ship 39 at this time can obtain a higher speed, similarly to the speed Vb of a crane truck, as the result of coupling the hydraulic clutch 23 of the mechanical supercharger 10 and producing the engine output Nb of a greater piston displacement. At the time of starting, a higher torque can be outputted in response to a lower speed and a higher load which corresponds to the area with the greatest water resistance at the Wb before planing. The acceleration at the start from a standstill, better normal running performance, and an improvement in fuel efficiency can be attained in the same way as the crane truck described above.

Figure 13:
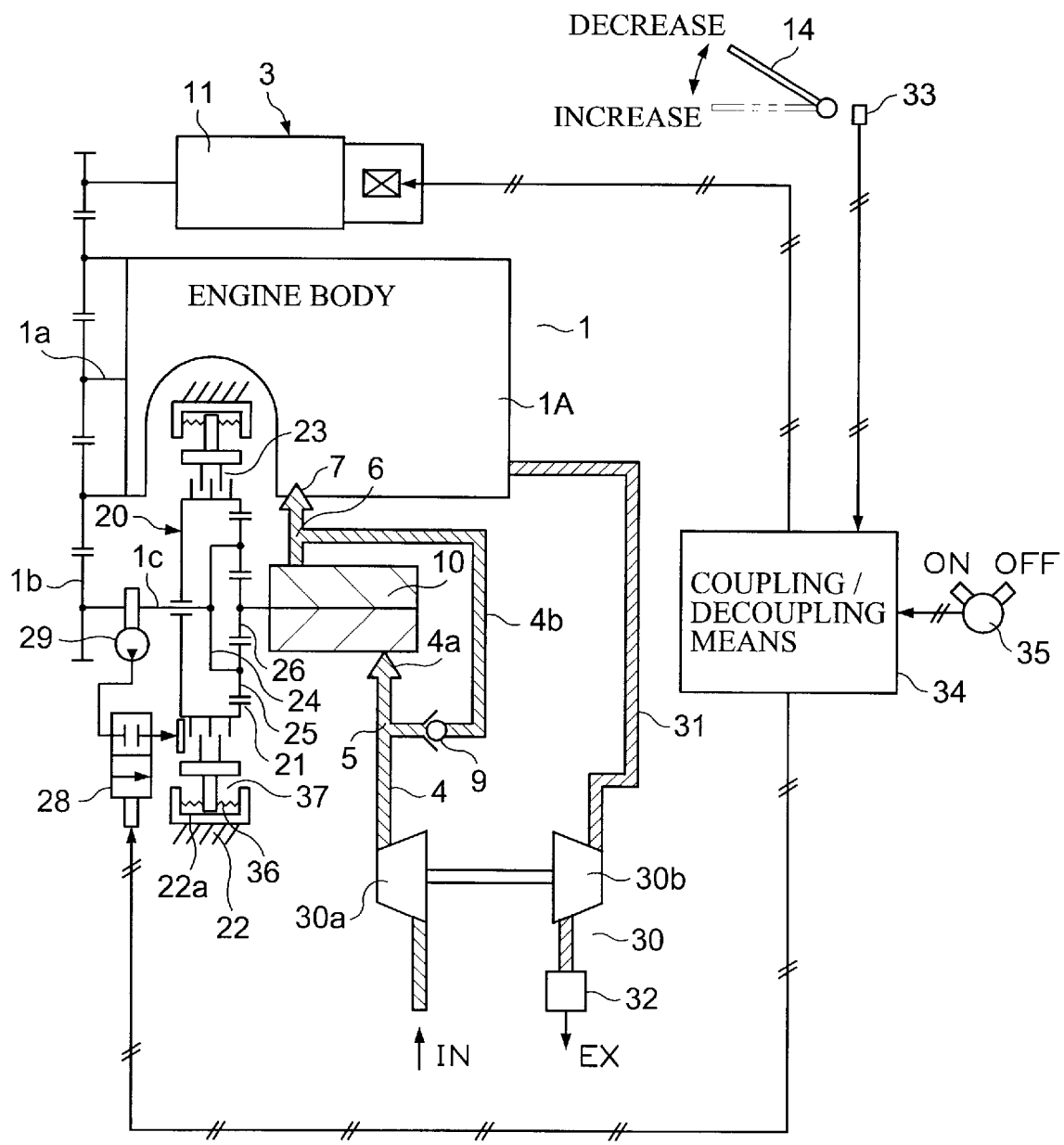
FIG. 13 is a block diagram of a fourth embodiment of the present invention.
Figure 14:
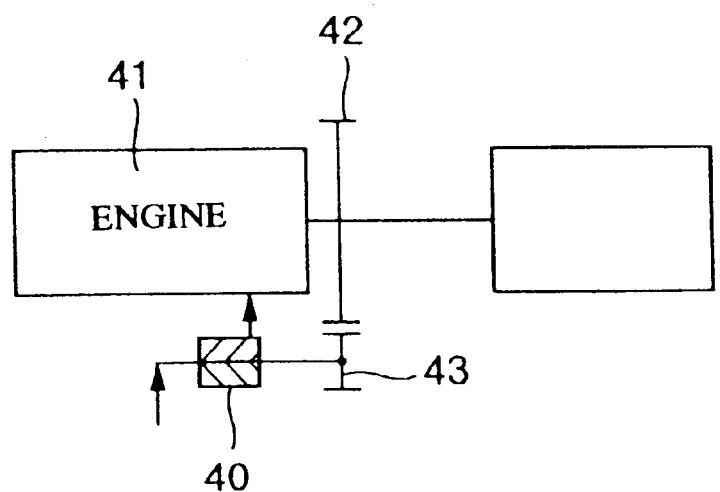
FIG. 14 is a block diagram of the mechanical supercharger of the conventional diesel engine.
Figure 15:
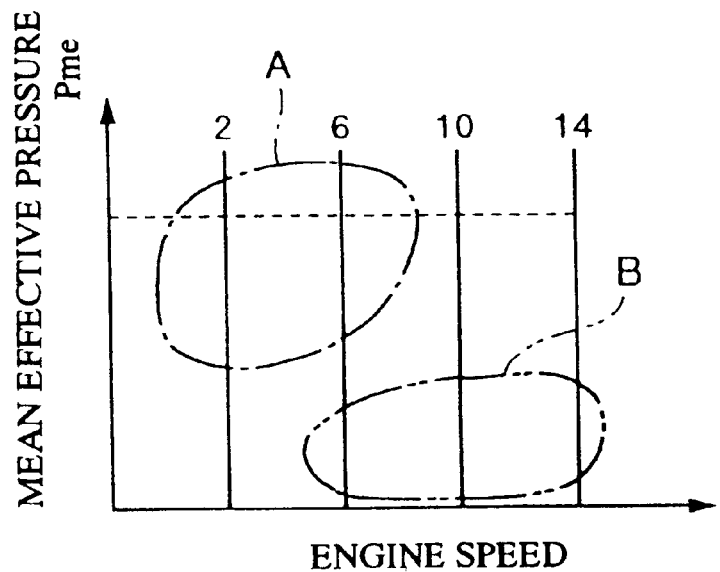
FIG. 15 is a diagram for explaining the relationship among the engine speed of the conventional mechanical supercharger, the mean effective pressure, and the amount of air of the mechanical supercharger.
Figure 16:
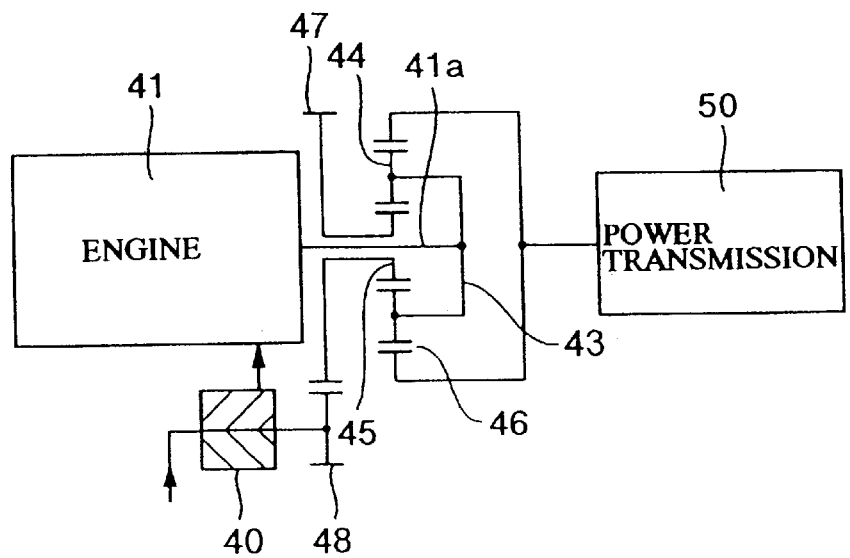
FIG. 16 is a block diagram of the conventional mechanical supercharger for an diesel engine, which is driven by an planetary gear train.
Figure 17:
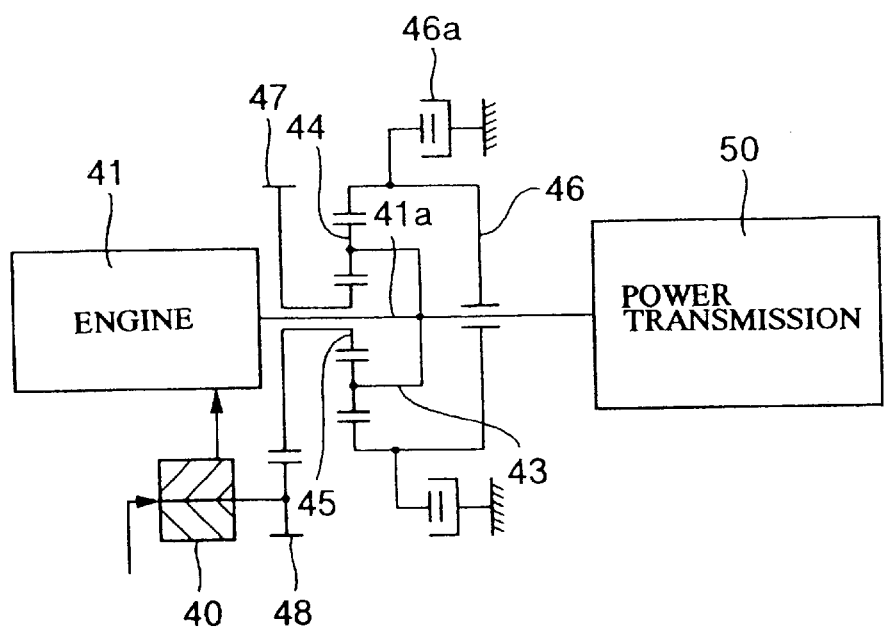
FIG. 17 is a block diagram in which the conventional mechanical supercharger is driven by the planetary gear train and a braking device is included.
Figure 18:
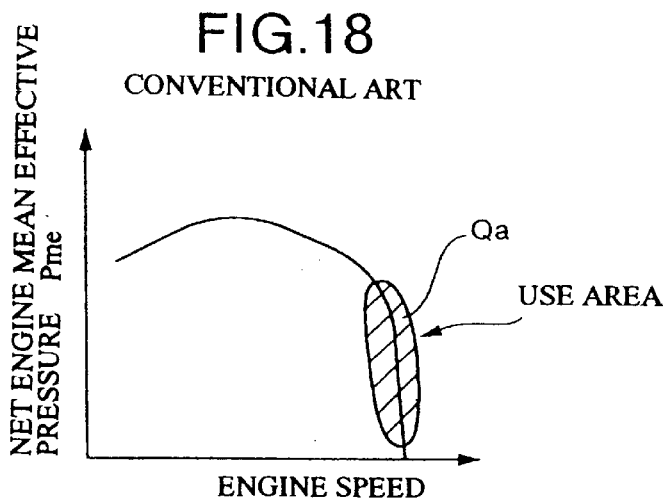
Figure 19:
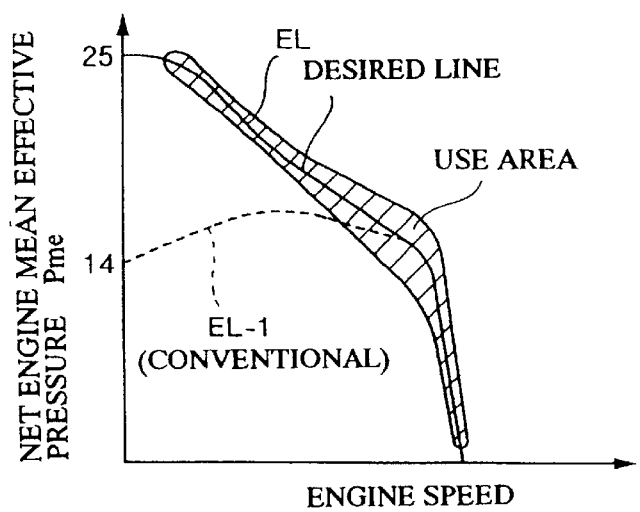
FIG. 19 is a diagram for explaining the output line of the conventional diesel engine which is required for higher output at lower and medium speed.
Figure 20:
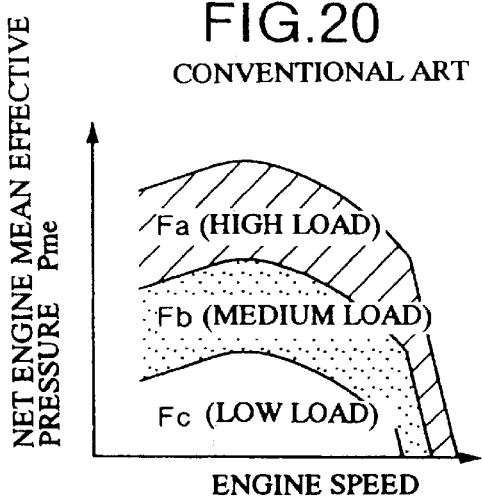
FIG. 20 is a diagram for explaining the usage of the conventional diesel engine according to the machines in which the engine is used.
Figure 21:
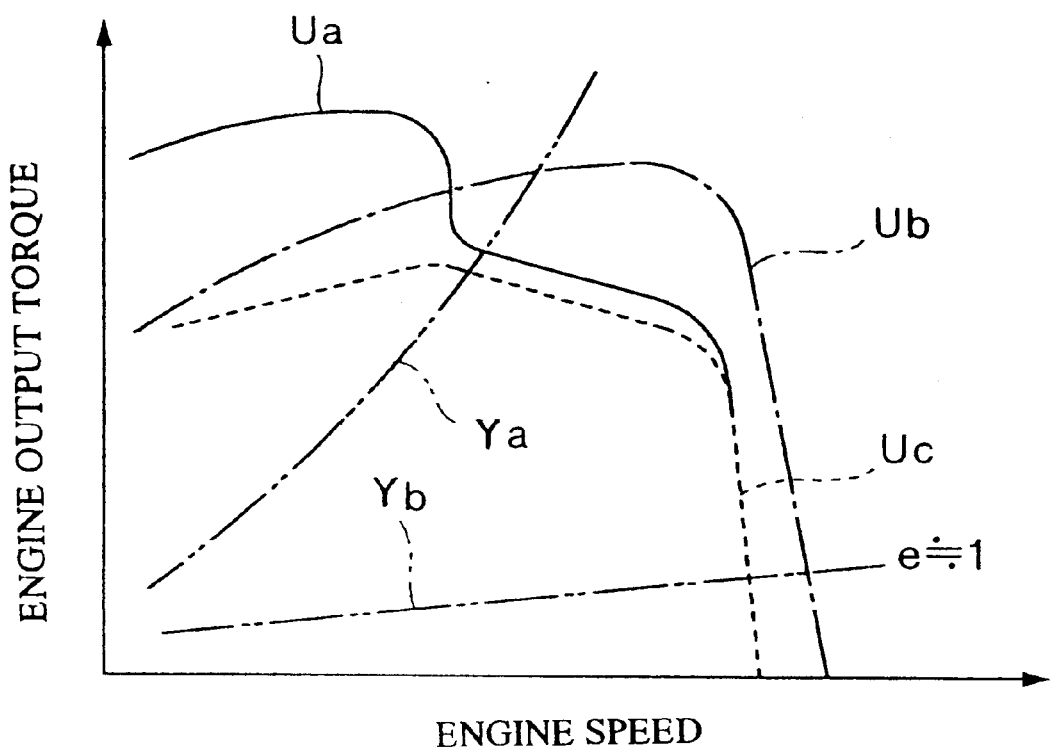
FIG. 21 is a diagram for explaining the relationship between the engine speed and the output torque of the engine when both a mechanical supercharger and a turbocharger are used in the conventional diesel engine.

In the second and third embodiments described above, a wet and multiple disc clutch is used as the hydraulic clutch 23. The hydraulic clutch 23 can be provided with a torque variance buffer member (torque variance buffering means) 37 between the hydraulic clutch 23 and the fixed outer wall 22 as a fourth embodiment as FIG. 13 shows. The torque variance buffer member 37 comprises a spring 36 which is inserted between the hydraulic clutch 23 attached to the ring gear 21 and a fixed plate 22a which is attached to the fixed outer wall 22. It is suitable that the spring 36 has an elastic body such as a coil spring, a belleville spring, or rubber.

According to the configuration described above, breakage of the gears of the planetary gear train 20 and of the mechanical supercharger 10, and pitching on the surface, which are caused by the twisting vibration of the engine 1 that is transmitted to the mechanical supercharger 10 through the planetary gear train 20, can be prevented as the result of reducing the twisting vibration with the torque variance buffer member 37.

In the explanation of the embodiments, in the first and second embodiments, the accelerator pedal 14 and the M—M governor 12 are interlocked by means of the rod 15, but an electrical control can be performed by providing the coupling/decoupling command means 34, such as the stroke distance detecting sensor 33 and a controller as in the third and the fourth embodiments. In the third and fourth embodiments, the M—M governor 12 can be used.

INDUSTRIAL AVAILABILITY

The present invention is useful as an apparatus and method for controlling a mechanical supercharger for a diesel engine by which the response in the initial stage of the acceleration, and the responsiveness can be improved, and by which better normal running performance, better hill-climbing performance, and better fuel efficiency can be obtained.

What is claimed is:

1. An apparatus comprising:
   a diesel engine, including one of an accelerator pedal and an accelerator lever;
   a governor which is interlocked with said one of an accelerator pedal and an accelerator lever;
   a fuel injection pump, which is controlled by said governor, for providing fuel to said diesel engine;

a mechanical supercharger for supplying pressurized air to said diesel engine;

a planetary gear train;

a wet and multiple disc hydraulic clutch, said planetary gear train and said hydraulic clutch being between said diesel engine and said mechanical supercharger so that said diesel engine can drive said mechanical supercharger via said hydraulic clutch and said planetary gear train, said hydraulic clutch being provided with a torque variance buffering means at a fixed side thereof;

a detector for detecting a position of said one of an accelerator pedal and an accelerator lever and for providing a signal representative thereof;

a hydraulic pump which is driven by said diesel engine; and a solenoid valve, which is actuated responsive to said signal from said detector, and which provides or stops a supply of pressurized oil from said hydraulic pump to said hydraulic clutch to couple or decouple said hydraulic clutch responsive to said signal.

2. Apparatus in accordance with claim 1, wherein said detector outputs said signal to couple said hydraulic clutch to drive said mechanical supercharger when a thus detected position is in a vicinity of a maximum fuel injection rate.

3. Apparatus in accordance with claim 1, wherein said detector outputs said signal to couple said hydraulic clutch to drive said mechanical supercharger when a thus detected position is in a range of a predetermined value in a vicinity of a maximum fuel injection rate to the maximum fuel injection rate.

4. Apparatus in accordance with claim 3, wherein said predetermined value is approximately two-thirds of the maximum fuel injection rate.

5. Apparatus in accordance with claim 1, wherein said detector outputs said signal to couple said hydraulic clutch to drive said mechanical supercharger when a thus detected position is in a range of a predetermined value in a vicinity of a maximum stroke of said one of an accelerator pedal and an accelerator lever to said maximum stroke.

6. Apparatus in accordance with claim 5, wherein said predetermined value is approximately three-fifths of said maximum stroke.

7. Apparatus in accordance with claim 6, further comprising a turbocharger connected in series with said mechanical supercharger to increase an output of said diesel engine.

8. Apparatus in accordance with claim 1, further comprising a turbocharger connected in series with said mechanical supercharger to increase an output of said diesel engine.

9. Apparatus in accordance with claim 1, further comprising a manually actuable change-over switch for outputting a coupling command to said hydraulic clutch to actuate said mechanical supercharger responsive to the coupling command.

10. Apparatus in accordance with claim 1, wherein said planetary gear train comprises a sun gear, a plurality of planet gears, and a ring gear, and wherein said torque variance buffering means comprises at least one plate attached to said ring gear and at least one plate attached to a fixed wall by at least one spring, whereby transmission to the mechanical supercharger of twisting vibration of said engine can be reduced.

* * * * *